Patented May 16, 1944

2,349,232

UNITED STATES PATENT OFFICE 2,349,232

MANUFACTURE OF ALICYCLIC COMPOUNDS

Lloyd M. Joshel, Hyattsville, Md., assignor to the United States of America as represented by Claude R. Wickard, Secretary of Agriculture, and his successors in office No Drawing. Application October 16, 1941, Serial No. 415,263

4 Claims. (Cl. 260—666)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new process for manufacturing organic compounds of the alicyclic class.

In general, the process comprises reacting ethylene with a conjugated diene, also known as 1,3-diene, under the action of heat. The reaction proceeds by the 1,4-addition of the ethylene to the diene, whereby the alicyclic compound produced has, in each case, one additional six-membered ring than the starting diene.

By means of this process a large number of alicyclic compounds can be synthesized which are not otherwise readily available, such as cyclohexene and derivatives thereof, including the alkyl, aryl, alkyloxy, carboalkoxy, and halogeno derivatives. In addition to these monocyclic compounds, various polycyclic compounds can also be formed.

More specifically, this invention comprises heating the ethylene and a 1,3-diene at an elevated pressure until an alicyclic compound is formed having one more six-membered ring than the original diene. In general, the reaction is indicated as follows:

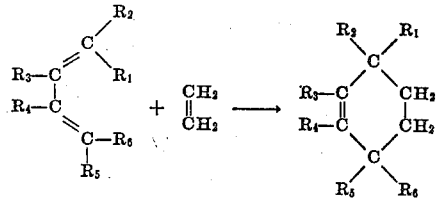

where one or more of the pairs consisting of $R_1$ and $R_6$, $R_2$ and $R_3$, $R_4$ and $R_5$, and $R_3$ and $R_4$ may be connecting bridge linkages consisting of

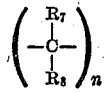

$n$ being an integer, and where substituents $R_7$ and $R_8$ and substituents $R_1$, $R_2$, $R_3$, $R_4$, $R_5$, and $R_6$, not already included in a bridge linkage, are chosen from the group consisting of alkyl, aryl, alkyloxy, carboalkoxy, halogen, and hydrogen.

The particular temperature and pressure at which the reaction is most favorably carried out depends in each case upon the characteristics of the conjugated diene used. In most cases, a temperature in the range of 175° to 300° C. is applicable, although it is possible that certain conjugated dienes will react at lower temperatures and that greater yields may be obtained with other compounds at higher temperatures. The temperature used, however, in any case should not be so high as to have a destructive effect upon the final product being formed. The pressures used also depend a great deal upon the character of the diene being used, as well as the vessel in which the reaction is carried out. Generally, there is not a critical upper limit with respect to pressure and, ordinarily, pressures above about 1,000 pounds per square inch at room temperature can be used to obtain satisfactory results.

The following examples will further illustrate the invention:

EXAMPLE I

Forty grams of 1,3-butadiene and about 200 cubic centimeters of ethylene were sealed in a rocking-type autoclave at room temperature under a pressure of about 900 pounds per square inch. The autoclave was then heated to about 200° C., whereupon the pressure rose to about 4,500 pounds per square inch. After shaking at this temperature for 15 hours the pressure dropped to about 2875 pounds per square inch. The system was then cooled to room temperature, and the cyclohexene formed was recovered by fractional distillation of the contents of the autoclave. The reaction is indicated as follows:

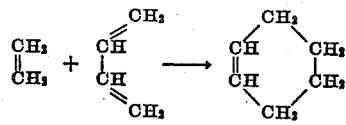

EXAMPLE II

About 200 cubic centimeters of ethylene and 39 grams of 2,3-dimethyl-1,3-butadiene were sealed in a rocking-type autoclave at room temperature under a pressure of 1,175 pounds per square inch and heated to about 200° C. The pressure rose to 6,200 pounds per square inch. The autoclave was shaken for 21 hours at 190° to 200° C., during which the pressure gradually dropped until it became constant at 3,550 pounds per square inch. The system was then cooled to room temperature and the 1,2-dimethylcyclohexene formed was isolated by fractional distillation. The reaction is indicated as follows:

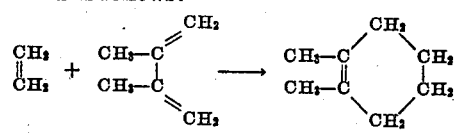

EXAMPLE III

Thirty-three grams of freshly distilled cyclopentadiene were sealed in a rocking-type autoclave with about 200 cubic centimeters of ethylene under a pressure of about 1,270 pounds per square inch at room temperature. On heating to about 200° C., the pressure rose to about 5,800 pounds per square inch. The mixture was shaken at this temperature for about 23 hours, although the reaction appeared to have been completed much sooner, as indicated when the pressure dropped to 4,600 pounds per square inch and remained constant. The content of the autoclave was then found to consist almost entirely of bicyclo(2.2.1)-2-heptene. This alicyclic compound was distilled and the fraction boiling at about 95° to 96° C. was collected. This product immediately solidified in the form of pure white crystals. The reaction is indicated as follows:

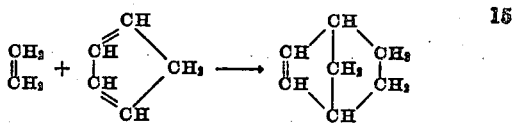

In some cases, in carrying out the process of this invention, compounds are produced other than the desired alicyclic compound, thereby causing a decrease in the yield of the desired compound. The formation of these undesired compounds may be suppressed by the addition of agents to prevent dimerization and polymerization, such as acetylene-dicarboxylic acid, hydroquinone, and others.

The above examples illustrate the method of this invention as applied to specific compounds. Other specific compounds which may be manufactured in accordance with this invention are as follows:

EXAMPLE IV.—*Alkyl derivatives of cyclohexene*

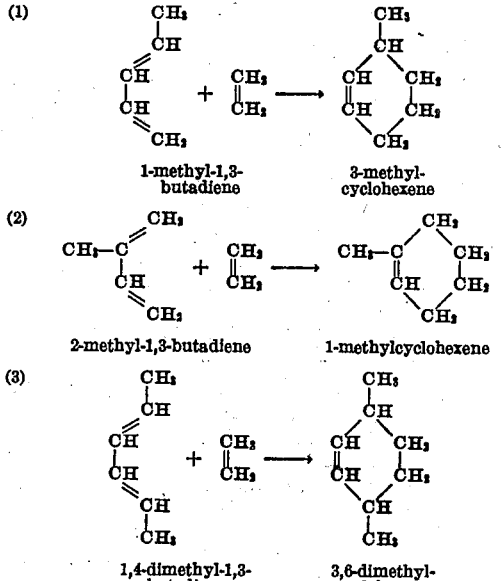

EXAMPLE V.—*Aryl derivatives of cyclohexene*

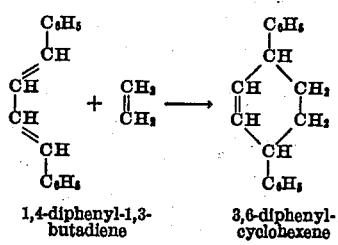

EXAMPLE VI.—*Halogen derivatives of cyclohexene*

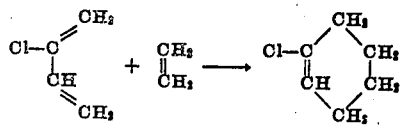

EXAMPLE VII.—*Polycyclic compounds*

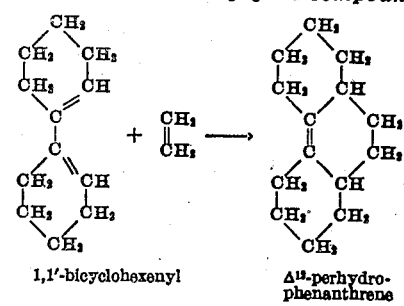

EXAMPLE VIII.—*Carboalkoxy derivatives of cyclohexene*

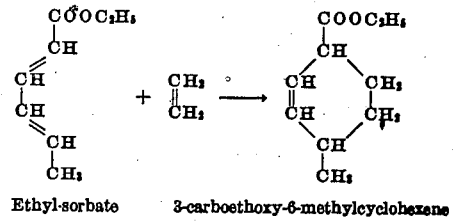

EXAMPLE IX.—*Alkyloxy derivatives of cyclohexene*

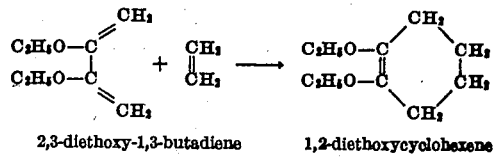

Having thus described my invention, I claim:

1. The process comprising heating ethylene and a 1,3-diene at a temperature below about 300° C. and at a pressure above 1000 pounds per square inch until an alicyclic compound is formed having one more six-membered ring than the original diene, and thence recovering said alicyclic compound.

2. The process of manufacturing bicyclo-(2.2.1)-2-heptene, comprising heating ethylene and cyclopentadiene at a temperature below about 300° C. and at a pressure above 1000 pounds per square inch until the heptene compound is formed, and thence recovering said heptene compound.

3. The process comprising heating while agitating ethylene and a 1,3-diene at a temperature below about 300° C. and at a pressure above 1000 pounds per square inch until an alicyclic compound is formed having one more six-membered ring than the original diene, and thence recovering said alicyclic compound.

4. The process comprising heating ethylene and a 1,3-diene in the absence of a catalyst at a temperature below about 300° C. and at a pressure above 1000 pounds per square inch until an alicyclic compound is formed having one more six-membered ring than the original diene, and thence recovering the alicyclic compound.

LLOYD M. JOSHEL.